US010047770B2

(12) United States Patent
Patmore et al.

(10) Patent No.: US 10,047,770 B2
(45) Date of Patent: Aug. 14, 2018

(54) PATIENT SUPPORT APPARATUS WITH HYDRAULIC CONTROL SYSTEM

(71) Applicant: Stryker Corporation, Kalamazoo, MI (US)

(72) Inventors: Kevin Mark Patmore, Plainwell, MI (US); Gary L. Bartley, Kalmazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 72 days.

(21) Appl. No.: 14/970,700

(22) Filed: Dec. 16, 2015

(65) Prior Publication Data

US 2016/0177977 A1 Jun. 23, 2016

Related U.S. Application Data

(60) Provisional application No. 62/094,315, filed on Dec. 19, 2014.

(51) Int. Cl.

| | |
|---|---|
| ***F16D 31/02*** | (2006.01) |
| ***F15B 11/16*** | (2006.01) |
| ***A61G 7/05*** | (2006.01) |
| ***A61G 7/10*** | (2006.01) |
| *A61G 7/018* | (2006.01) |

(52) U.S. Cl.

CPC ................ *F15B 11/16* (2013.01); *A61G 7/05* (2013.01); *A61G 7/1019* (2013.01); *A61G 7/018* (2013.01); *F15B 2211/20507* (2013.01)

(58) Field of Classification Search

CPC . F15B 11/163; F15B 2211/423; A61G 7/1019

USPC ............................................... 60/481; 91/515

See application file for complete search history.

(56) References Cited

U.S. PATENT DOCUMENTS 3,986,692 A * 10/1976 Kinoshita ............ F16C 11/106 60/481

6,514,055 B1 * 2/2003 Schuller ............... B60T 8/4031 417/460

(Continued)

FOREIGN PATENT DOCUMENTS

DE 4301547 A1 8/1994

WO 0066394 A1 11/2000

(Continued)

OTHER PUBLICATIONS

European Search Report and Written Opinion dated Apr. 29, 2016 for European patent application EP 15199528, corresponding to U.S. Appl. No. 14/970,700.

*Primary Examiner* — Michael Leslie

(74) *Attorney, Agent, or Firm* — Warner Norcross + Judd LLP

(57) ABSTRACT

A patient support apparatus includes a base, a litter frame, and an elevation assembly supporting the litter frame on the base. The elevation assembly is configured to effect changes in elevation of the litter frame relative to the base. The elevation assembly includes a pair of hydraulic actuators and a hydraulic fluid control system for delivering fluid to the first and second hydraulic actuators. The control system includes a pump and a user operable control coupled to the pump for controlling the flow of hydraulic fluid from the pump to the first and second hydraulic actuators.

18 Claims, 6 Drawing Sheets

(56) References Cited

U.S. PATENT DOCUMENTS

| | | | | |
|---|---|---|---|---|
| 7,284,626 | B2 * | 10/2007 | Heimbrock | A61G 7/018 180/19.1 |
| 7,299,897 | B2 * | 11/2007 | Stockmann | B60P 1/4471 91/515 |
| 7,996,939 | B2 * | 8/2011 | Benedict | A61G 1/0293 5/614 |
| 8,020,486 | B2 * | 9/2011 | Yamamoto | F15B 11/042 60/565 |
| 2007/0257064 | A1 * | 11/2007 | Ophardt | B05B 11/3001 222/251 |

FOREIGN PATENT DOCUMENTS

| | | | |
|---|---|---|---|
| WO | 2006036980 | A1 | 4/2006 |
| WO | 2009116859 | A1 | 9/2009 |
| WO | 2014089180 | A1 | 6/2014 |

* cited by examiner

PATIENT SUPPORT APPARATUS WITH HYDRAULIC CONTROL SYSTEM

CROSS-REFERENCE TO RELATED APPLICATION

This application claims the benefit of U.S. Provisional Patent Application No. 62/094,315, filed Dec. 19, 2014, which is incorporated herein by reference in its entirety and commonly owned by Stryker Corporation of Kalamazoo, Michigan.

FIELD OF THE INVENTION

The present invention relates to a patient support apparatus and, more particularly, to a patient support apparatus with a hydraulic elevating system.

BACKGROUND OF THE INVENTION

Wheeled patient supports that have adjustable height litters often use dual hydraulic actuators to raise or lower the litter relative to their wheeled base. Each actuator has its own hydraulic supply system. Control of the actuators is often done via foot pedals, with a complex linkage system in order to control the actuators and assure that the litter remains level when being raised or lowered.

SUMMARY OF THE INVENTION

In one embodiment, a patient support apparatus includes a first member, a second member, and first and second hydraulic actuators operable to selectively move the first member relative to the second member. The apparatus further includes a hydraulic fluid control system for delivering fluid to the first and second hydraulic actuators. The control system includes a pump and a user operable control coupled to the pump for controlling the flow of hydraulic fluid from the pump to the first and second hydraulic actuators. For example, the patient support apparatus may comprise a stretcher.

In one aspect, the user operable input comprises a pedal.

In any of the above apparatuses, the control system further comprises a housing and a fluid reservoir. The pump is mounted in the housing and in fluid communication with the fluid reservoir. The user operable control is also mounted at the housing. For example, the user operable control may be directly coupled to the pump through the housing.

In any of the above apparatuses, this fluid reservoir is mounted in the housing.

According to yet other aspects, the control system includes first and second high pressure conduits in fluid communication with the pump and the first and second hydraulic actuators, respectively. The control system further includes first and second overflow conduits.

The first and second overflow conduits are in fluid communication with and allow fluid to return to the fluid reservoir from the first and second hydraulic actuators, respectively.

In any of the above apparatuses, the pump is a manually operated hydraulic pump directly coupled to the pedal. The pump is adapted to pump the hydraulic fluid to the first and second hydraulic actuators in response to movement of the pedal.

In any of the above apparatuses, the pump includes a stepped cylinder piston in order to selectively deliver the same fluid volume to each of the first and second hydraulic actuators.

In another embodiment, a hydraulic control system for a patient support includes a fluid reservoir, a pump in fluid communication with said fluid reservoir, and first and second hydraulic actuators in fluid communication with the pump. A fluid supply conduit is in fluid communication with the pump and the reservoir for delivering fluid to the pump. First and second high pressure conduits are in fluid communication with the pump and the first and second hydraulic actuators for delivering fluid to the first and second hydraulic actuators from the pump. In addition, the control system includes a user operable control coupled to the pump to control the pump to deliver fluid from the pump to the first and second hydraulic actuators and a housing enclosing the pump and supporting the user operable control.

In one aspect, the system also includes a check valve for each of the high pressure conduits. The housing optionally also encloses the check valves.

In any of the above control systems, the housing also encloses the reservoir.

In any of the above control systems, the user operable input comprises a pedal. For example, the pedal may be directly coupled to the pump through the housing without the use of a linkage system.

In any of the above systems, the pump includes a stepped cylinder piston in order to selectively deliver the same fluid volume to each of the first and second hydraulic actuators.

In any of the above systems, the system further includes first and second lowering valves to control the flow of fluid from the first and second hydraulic actuators, respectively, to the reservoir. For example, the housing may enclose the lowering valves.

Optionally, the control system also includes first and second overflow conduits, with the first and second overflow conduits being in fluid communication with and allowing fluid to return to said fluid reservoir from the first and second hydraulic actuators, respectively.

According to yet another embodiment, a patient support apparatus includes a first member, a second member, and first and second hydraulic actuators operable to selectively move the first member relative to the second member. The apparatus also includes a hydraulic fluid control system for delivering fluid to the first and second hydraulic actuators. The control system includes a fluid reservoir, a pump in fluid communication with the fluid reservoir and the first and second hydraulic actuators for delivering hydraulic fluid from the fluid reservoir to the first and second hydraulic actuators. The control system further includes a user operable control coupled to the pump to control the pump to selectively deliver fluid from the pump to the first and second hydraulic actuators. A housing encloses the pump and supports the user operable control.

In one aspect, the user operable input comprises a pedal. For example, the pedal may be directly coupled to the pump through the housing without the use of a linkage system.

Optionally, the fluid reservoir is mounted in the housing.

In yet another embodiment, a method of controlling a pair of hydraulic actuators in a patient support apparatus includes enclosing a pump in a housing, mounting a user operable control at the housing, and directly coupling the user operable control to the pump. The method further includes pumping fluid from a reservoir with a pump and discharging the fluid from the pump into two conduits in response to the user operable control. The discharging includes dividing the fluid so that the fluid volume discharged into the two conduits is substantially the same and directing the flow of fluid in each conduit to a respective hydraulic actuator of the pair of hydraulic actuators, wherein each actuator receives the same amount of fluid such that their extension is substantially the same.

BRIEF DESCRIPTION OF THE DRAWINGS

Other objects and purposes of the invention will be apparent to persons acquainted with apparatus of this general type upon reading the following specification and inspecting the accompanying drawings in which.

DETAILED DESCRIPTION OF THE PREFERRED EMBODIMENTS

Figure 1:
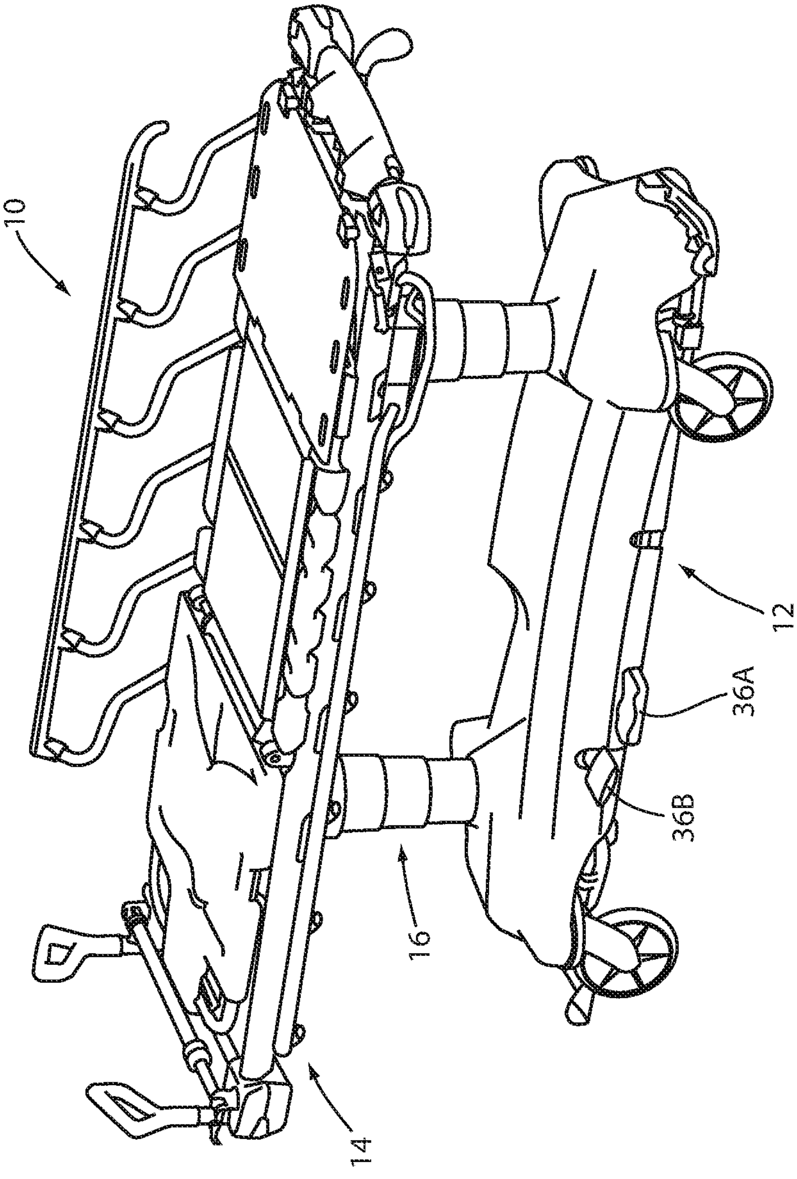
FIG. 1 is a perspective view of a patient support apparatus.

Referring to FIG. 1, the numeral 10 generally designates a patient support apparatus for transporting a patient. As will be more fully described below, patient support apparatus 10 includes a hydraulic elevation assembly that allows one member or component of patient support apparatus 10 to be moved relative to another member or component and to remain level while being raised. For example, in the illustrated embodiment, the elevation assembly comprises a litter elevation assembly for raising and lowering the litter noted below.

As best seen in FIG. 1, patient support apparatus 10 includes a wheeled base 12, a patient support litter 14, and an elevation assembly 16 interconnecting base 12 to patient support litter 14. The configuration of the base can be of many different varieties. For example, base 12 may be a powered base driven by a motor, such as described in U.S. Pat. Nos. 6,752,224; 7,007,765; 6,792,630; 6,725,956; 6,256,812; and 8,442,738, which are incorporated in their entirety herein.

Figure 2:
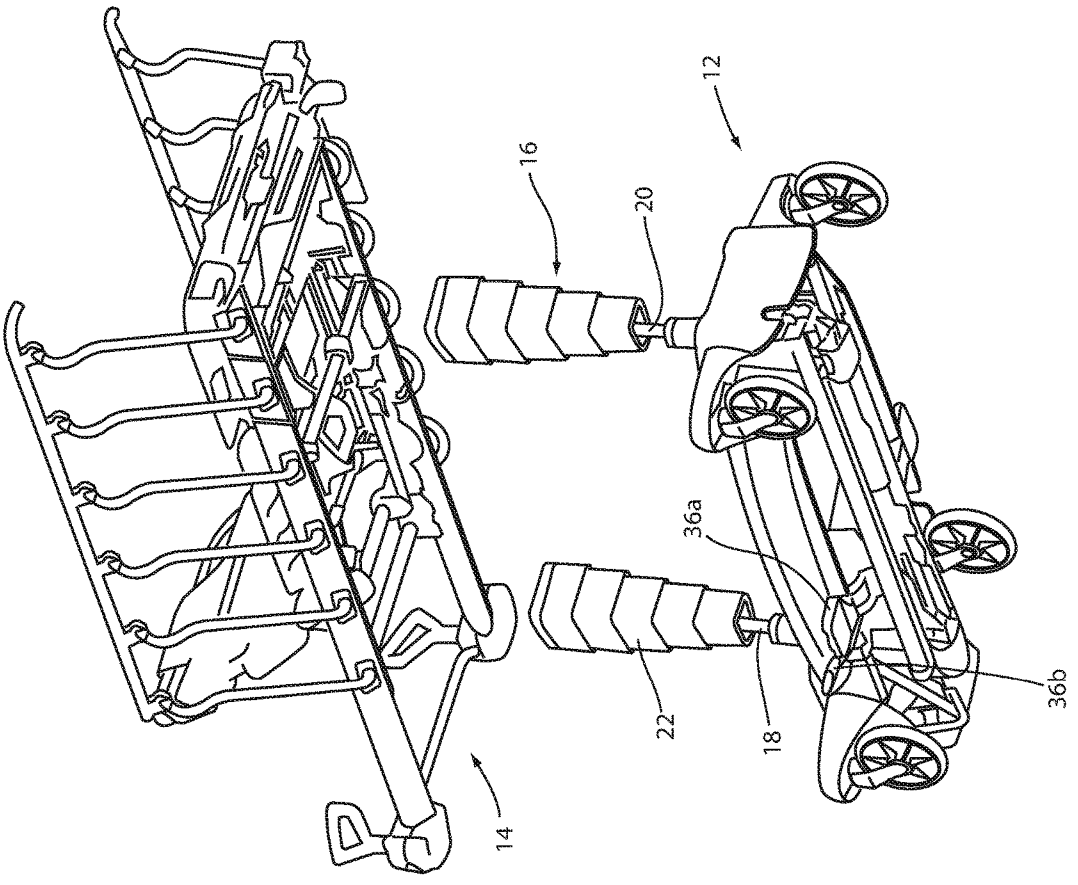
FIG. 2 is an exploded perspective view of a patient support apparatus with an elevation assembly.

Elevation assembly 16 in this particular embodiment includes a pair of extendable and retractable hydraulic actuators or jacks 18, 20, shown in FIG. 2. Each of the actuators may be enshrouded in a telescoping shroud 22, one end of which is mounted on base 12 and the upper end of which is secured to the underside of patient support litter 14. Shrouds 22 conceal the actuators and also protect a caregiver from the moving components of the actuators. For more details of a suitable shroud, reference is made to U.S. Pat. No. 7,412,735, which is commonly owned by Stryker Corp. of Kalamazoo, Mich. and incorporated by reference herein in its entirety.

Figure 3:
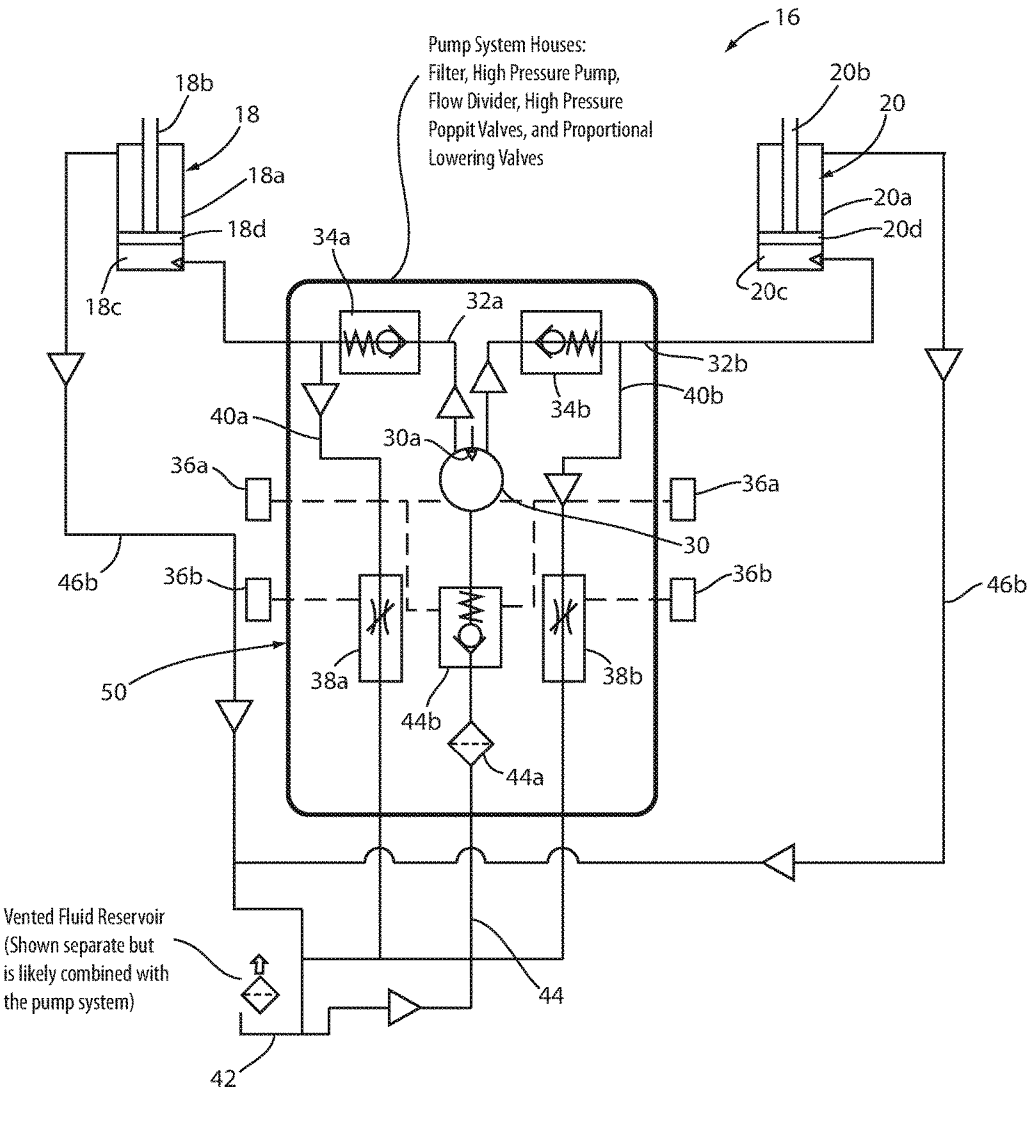
FIG. 3 is a schematic drawing of a hydraulic system of the elevation assembly of the patient support.
Figure 4:
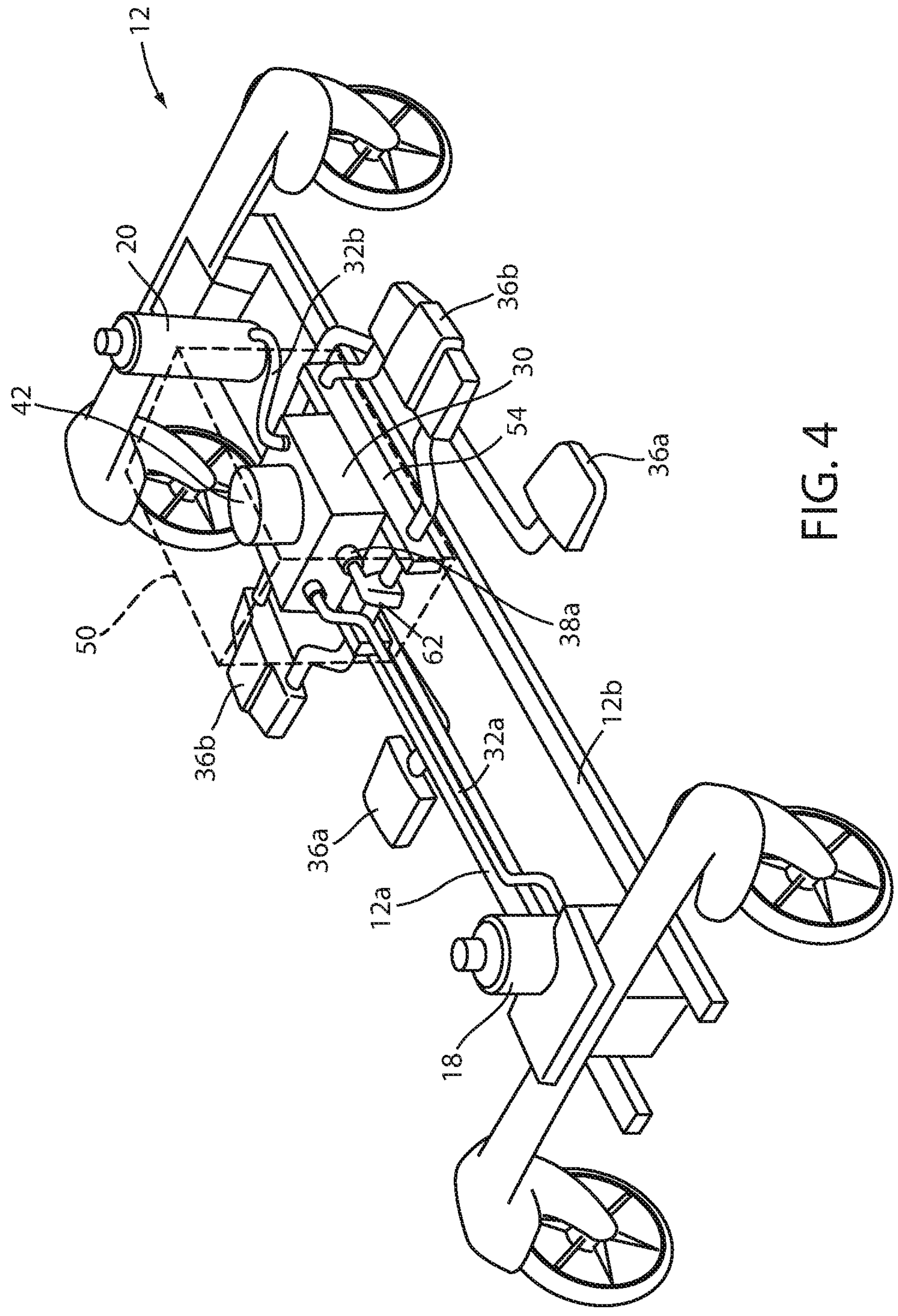
FIG. 4 is a perspective view of the base of the patient support apparatus.

Referring to FIG. 3, hydraulic actuators 18, 20 each include a hydraulic cylinder housing 18*a*, 20*a* with a rod 18*b*, 20*b*, respectively, that is raised or lowered when fluid is pumped into or out of the chamber 18*c*, 20*c* formed by the cylinder housings. In the illustrated embodiment, each actuator 18, 20 comprises a single acting, single stage jack with its chamber located on one side of the piston 18*d*, 20*d*, which is mounted to the rod internally of the cylinder housing. To supply fluid to chambers 18*c*, 20*c*, elevation system 16 includes a pump 30, for example a high pressure, manually operable pump that outputs fluid in a pressure range of 100 to 1000 psi, optionally in a range of 300 to 600 psi, and a flow divider 30*a*, which directs the flow of fluid from pump 30 to two supply conduits 32*a*, 32*b*, which are in fluid communication with actuators 18, 20 through check valves 34*a*, 34*b*. Conduits 32*a*, 32*h* may be rigid or flexible high pressure hoses.

In order to deliver the same fluid volume to each of the first and second hydraulic actuators 18, 20, pump 30 may include a stepped cylinder piston 30*a*. Further, to activate the flow of fluid from pump 30, elevation assembly 16 includes one or more user operable controls 36*a*, such as manually operable controls, including pump or lifting pedals. Controls 36*a* are coupled to pump to selectively control the flow of fluid to the actuators to raise the litter. Optionally, controls 36a are directly coupled to pump 30 without the use of a linkage system.

To lower the litter, elevation system 16 includes lowering valves 38*a*, 38*b*. Lowering valves 38*a*, 38*b* may comprise proportional lowering valves, which are in selective fluid communication with the supply conduits 32*a*, 32*b* through return conduits 40*a*, 40*b*. Valves 38*a*, 38*b* are also coupled to controls 36*b*, such as lowering pedals, so that user operable controls 36*a* can operate to selectively deliver fluid from pump 30 to first and second hydraulic actuators 18, 20 or user operable controls 36*b* selectively drain the fluid from the chambers in the actuators through valves 38*a*, 38*b* to lower the rods, and hence lower litter 14. As will be more fully described below, valves 38*a*, 38*b* may be independently controlled so that actuators 18, 20 may be independently controlled when lowering litter 14. The return conduits 40*a*, 40*b* may similarly be rigid or flexible high pressure hoses.

Conduits 40*a*, 40*b* are in fluid communication with a reservoir 42, such as a vented fluid reservoir, to divert fluid from the actuators for later use by the pump. Reservoir 42 supplies fluid to pump 30 through an intake conduit 44 with an optional filter 44*a* and a check valve 44*b*. Thus, when it becomes desirable to raise the patient support litter, fluid is delivered from reservoir 42 by way of a single pump (30) to each of hydraulic actuators 18, 20. And, when it becomes desirable to lower the patient support litter 14, hydraulic fluid can be directed from chambers 18*c*, 20*c* of actuators 18, 20 back to the reservoir 42 with independent lowering control over the actuators. While the specific valving has been described herein in reference to the hydraulic circuit of elevation assembly 14, it should be understood that other suitable valving may be used to control the flow of fluid to and from the actuators.

To allow the system to self-prime, elevation assembly 14 may also include an overflow circuit in the form of overflow conduits 46*a*, 46*b*, Conduits 46*a*, 46*b* are in fluid communication with the chambers formed on the other side of the pistons (from chamber 18*c*, 20*c*) and discharge into reservoir 42. This overflow circuit can allow for self-priming and a non-hard stop in the user operable controls 36*a*, 36*b* (e.g. pedals).

Referring again to FIG. 3, optionally, at least pump 30 is enclosed in a housing 50. For example, a suitable housing may be an enclosure formed from a plastic material, a metal material, a composite material, or a combination of any of the aforesaid materials. In addition to housing pump 30, housing 50 may provide support and a mounting surface for user operable controls 36*a*, 36*b*. Thus, controls 36*a* may couple to pump 30, and controls 36*b* may couple to valves 38*a*, 38*b*, through housing 50.

Optionally, housing 50 may also enclose the valving, for example, enclose check valves 32*a*, 32*b*, lowering valves 38*a*, 38*b*, check valve 44*b*, as well as filter 44*a* and at least a portion of the hydraulic conduits 32*a*, 32*b*, 40*a*, 40*b*, and 44. Further, in one embodiment, housing 50 may enclose the reservoir 42, as well as at least a portion of the overflow conduits 46*a*, 46*b*.

Referring to FIGS. 4-9, housing 50 may be mounted in base 12 by a pair of mounting brackets 52 and 54, In the illustrated embodiment, brackets 52 and 54 are mounted to the longitudinal elements 12*a* and 12*b* of base 12. However, it should be understood that housing 50 may be mounted to other base components and/or using other mounting mechanisms, Each bracket 52, 54 is adapted to mount user operable controls 36*a*, 36*b*, namely pedals, to housing 50. For example, brackets 52, 54 each include a web 56, 58 with transverse mounting openings 56*a*, 58*b* for receiving and supporting a shaft 60. User operable controls 36*b* are rotatably mounted to the opposed ends of shaft 60. Shaft 60 has a central shaft portion 60*a* that is offset from its opposed ends to form a crank so that when the user operable controls 36*b* are pressed downwardly, the downward motion will be translated into rotation at the central shaft portion, which is coupled to the lowering valves. Mounted to central shaft portion 60*a* of shaft 60 is an actuator 62 that is directly coupled to the lowering valve, which rotates toward and presses the lowering valve when the central shaft portion is rotated to thereby open the lowering valve when the user operable controls 36*b* are lowered—in other words when a user presses downward on the lowering pedal.

Figure 5:
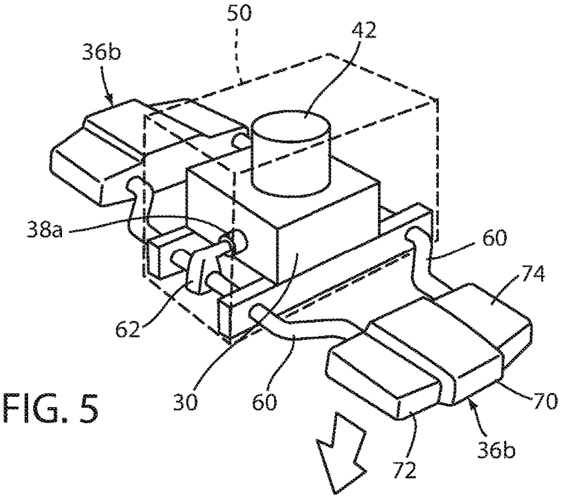
FIG. 5 is an enlarged perspective view of the hydraulic pump and user operable controls for lowering the actuators.
Figure 6:
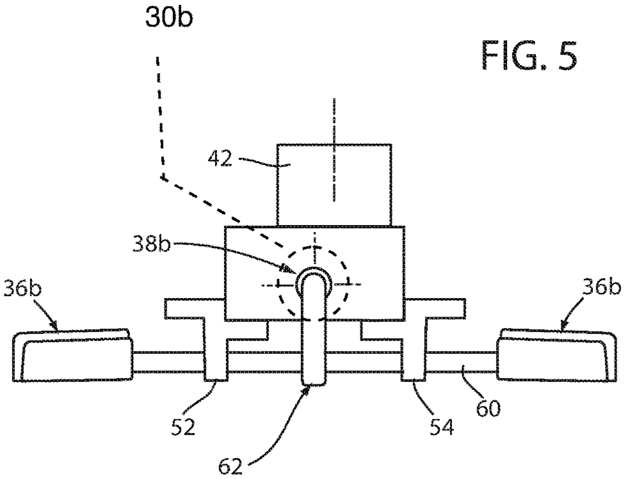
FIG. 6 is an enlarged end view of the hydraulic pump and user operable controls for lowering the actuators.
Figure 7:
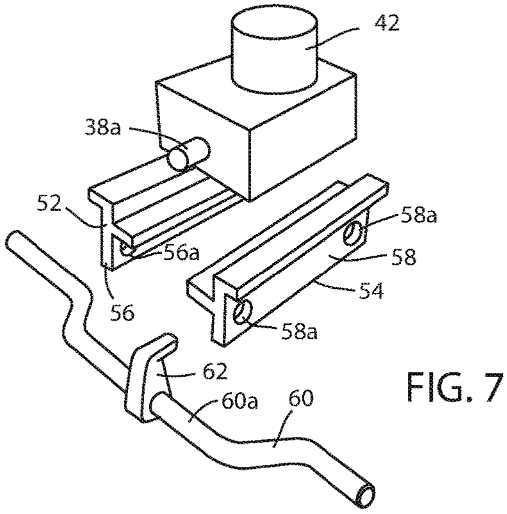
FIG. 7 is an enlarged exploded perspective view of the hydraulic pump and user operable controls for lowering the actuators.

To actuate both lowering valves 38*a*, 38*b*, user operable controls 36*b* are mounted to the opposed ends of a pair of shafts 60, which have a mirror image configuration as shown in FIG. 5. In this manner, when user operable controls 36*b* are pressed downwardly, the central shaft portion of one shaft will rotate in a clockwise direction, and the central shaft portion of the other shaft will rotate in a counter-clockwise direction so that their respective actuators press on lowering valves 38*a*, 38*b* at the same time. This will allow the litter deck to remain level when being lowered.

As noted above, the lowering valves may be controlled independently. For example, user operable controls 36*b* may be formed by a lowering pedal that includes a central body 70 and left and right extended body portions 72 and 74 (the terms left and right are used in reference to FIG. 5) that extend from central body 70. With this configuration, if a user presses on one of the extended body portions, the pedal will tilt downward instead of the whole pedal moving downwardly. In this manner, only one shaft will be rotated so that a user may independently control one lowering valve. Optionally, central body 70 may have a larger cross-section than the extended body portions 72, 74 to provide a demarcation between the central body and the extended body portions to identify where a user must apply pressure to lower the pedal versus tilt the pedal or vice versa.

Figure 8:
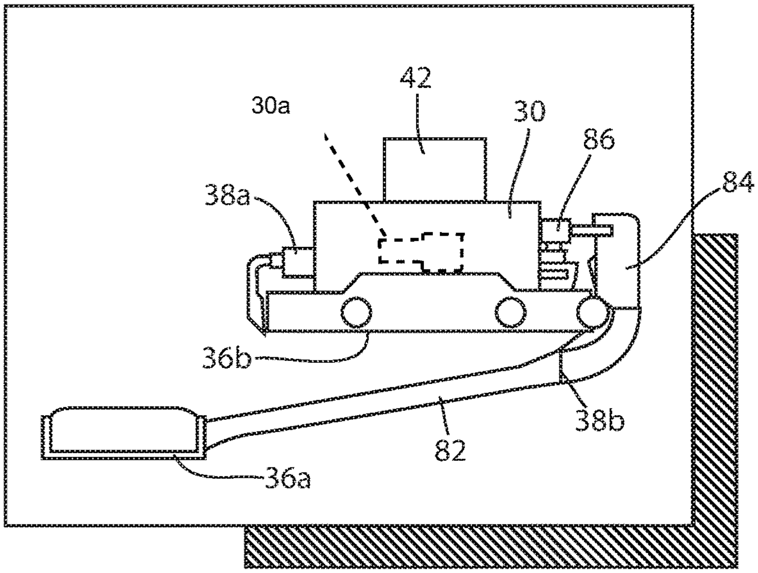
FIG. 8 is a side view of the hydraulic pump and user operable controls for raising the actuators.
Figure 9:
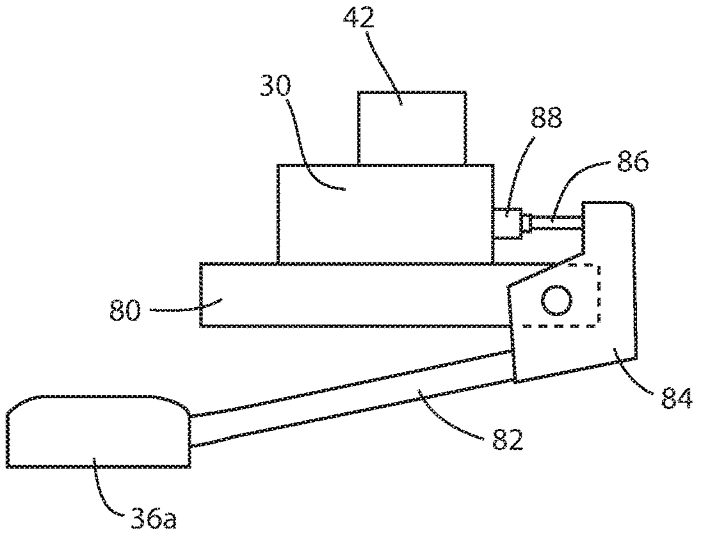
FIG. 9 is an enlarged side view of the hydraulic pump and user operable controls for raising the actuators.

As best seen in FIGS. 8 and 9, user operable controls 36*a* for the pump are also mounted to housing 50, for example, by a bracket 80, which may be located between brackets 52, 54. User operable controls 36*a* each include a shaft 82 and an actuator 84 mounted to the end of shaft. Actuator 84 is pivotally attached to bracket 80 and includes a protecting rod 86 for coupling to (e.g. pressing) and actuating the pump ram 88, which projects through housing 50 to thereby be engaged by actuator 84. Thus, when a user presses downward on either user operable control 36*a*, namely the pump or lifting pedal, actuator 84 will press on pump ram 88 to cause pump 30 to operate and direct the flow of fluid to the lift actuators 18, 20 to raise or lift the litter deck. User operable controls 36*a* are both coupled to the same actuator so that the pump can be controlled from either side of patient support 10.

The present elevation assembly, therefore, allows for direct connection of the raising and lowering user operable controls (e.g. pedals) to a single hydraulic control unit (which consists of at least a housing, a pump, and various valving), which can eliminate the need for complex linkage system, wires, or cabling. Further, the assembly allows for modular assembly of the entire system so that it can be “dropped-in” to, for example, the frame of base 12.

Although particular preferred embodiments of the invention have been disclosed in detail for illustrative purposes, it will be recognized that variations or modifications of the disclosed apparatus, including the rearrangement of parts, lie within the scope of the present invention. Further, certain terminology has been used in the description for convenience and in reference to the orientation of the patient support apparatus shown in the drawings and are not intended to be limiting. For example, the words “up”, and “down”, “right” and “left” designate directions in the drawings to which reference is made. Such terminology will include derivatives and words of similar import.

We claim:

1. A patient support apparatus comprising:

a patient support deck;

a base;

first and second hydraulic actuators operable to selectively lift or lower said patient support deck relative to said base; and a hydraulic fluid control system for delivering fluid to said first and second hydraulic actuators, said hydraulic fluid control system including a hydraulic fluid control unit having a pump and a housing enclosing said pump, said hydraulic fluid control system further including first and second fluid conduits for delivering the hydraulic fluid to both of said first and second hydraulic actuators from said pump and a manually operable control mounted to said hydraulic control unit and coupled to said pump for controlling the flow of hydraulic fluid through said first and second fluid conduits to said first and second hydraulic actuators, wherein the flow of fluid through said fluid conduits to said hydraulic cylinders is controlled by said pump and without the use of control valves.

2. The patient support apparatus of claim 1, wherein the manually operable control comprises a pedal.

3. The patient support apparatus of claim 1, wherein the control unit further comprises a fluid reservoir, said pump in fluid communication with said fluid reservoir, and said manually operable control mounted at said housing.

4. The patient support apparatus of claim 3, wherein said manually operable control includes an actuator to engage said pump.

5. The patient support apparatus of claim 3, wherein said fluid reservoir is mounted in said housing.

6. The patient support apparatus of claim 3, wherein the control system further includes first and second overflow conduits, and said first and second overflow conduits being in fluid communication with and allowing fluid to return to said fluid reservoir from said first and second hydraulic actuators, respectively.

7. The patient support apparatus of claim 2, wherein the pump is a manually operated hydraulic pump directly coupled to said pedal, said pump adapted to pump the hydraulic fluid to said first and second fluid conduits in response to movement of said pedal.

8. The patient support apparatus of claim 1, wherein said pump includes a stepped cylinder piston.

9. The patient support apparatus of claim 1, wherein the patient support apparatus is a stretcher.

10. A patient support comprising:

a patient support deck;

a base;

a hydraulic fluid control unit comprising:

a fluid reservoir;

a pump in fluid communication with said fluid reservoir;

a fluid supply conduit in fluid communication with said pump and said reservoir for delivering fluid to said pump from said reservoir; and a housing enclosing said pump;

first and second hydraulic actuators in fluid communication with said pump and operable to raise or lower said patient support deck relative to said base;

first and second high pressure conduits in fluid communication with said pump and said first and second hydraulic actuators for delivering fluid to said first and second hydraulic actuators from said pump, and wherein the flow of fluid through said high pressure conduits to said hydraulic actuators is controlled by said pump and without the use of control valves; and a manually operable control mounted at said housing and coupled to said pump to control the flow of hydraulic fluid through said first and second high pressure conduits to said first and second hydraulic actuators, and said housing adapted to mounted said pump and said manually operable control as an assembly to said patient support.

11. The patient support of claim 10, further comprising a check valve for each of said high pressure conduits, and said housing enclosing said check valves.

12. The patient support of claim 11, wherein said housing encloses said reservoir.

13. The patient support of claim 11, wherein said manually operable control comprises a pedal.

14. The patient support of claim 13, wherein said manually operable control includes an actuator to engage said pump.

15. The patient support of claim 10, wherein said pump includes a stepped cylinder piston.

16. The patient support of claim 11, further comprising first and second lowering valves to control the flow of fluid from said first and second hydraulic actuators, respectively, to said reservoir.

17. The patient support of claim 16, wherein said housing encloses said lowering valves.

18. The patient support of claim 17, wherein the control system includes first and second overflow conduits, and said first and second overflow conduits being in fluid communication with and allowing fluid to return to said fluid reservoir from said first and second hydraulic actuators, respectively.

* * * * *